United States Patent [19]

Takeuchi et al.

[11] 4,442,828
[45] Apr. 17, 1984

[54] PORTABLE TYPE SOLAR HEAT COOKER ASSEMBLY

[75] Inventors: Hirosato Takeuchi; Toshio Mikiya, both of Tokyo, Japan

[73] Assignee: Nitto Kohki Co., Ltd., Tokyo, Japan

[21] Appl. No.: 439,608

[22] Filed: Nov. 5, 1984

[30] Foreign Application Priority Data

Nov. 6, 1981 [JP] Japan ................................ 56-177077

[51] Int. Cl.$^3$ ................................................ F24J 3/02
[52] U.S. Cl. .................................... 126/451; 126/438; 215/13 R; 248/311.2; 248/201
[58] Field of Search .............. 126/451, 438, 443, 901; 215/12 A, 13 R; 248/130, 133, 136, 201, 311.2

[56] References Cited

U.S. PATENT DOCUMENTS

| | | | |
|---|---|---|---|
| 2,994,318 | 8/1961 | Lee | 126/451 |
| 3,025,851 | 3/1962 | Steinberg | 126/451 |
| 4,186,725 | 2/1980 | Schwartz | 126/451 X |
| 4,196,721 | 4/1980 | Posnansky | 126/451 |
| 4,262,660 | 4/1981 | Ilich | 126/451 |
| 4,281,644 | 8/1981 | Chiles | 126/451 |

Primary Examiner—Samuel Scott
Assistant Examiner—Randall L. Green
Attorney, Agent, or Firm—Birch, Stewart, Kolasch & Birch

[57] ABSTRACT

A portable type solar heat cooker assembly including a cooking glass tube comprising an outer bottomed glass tube and an inner bottomed glass tube coated with a selective absorption film showing a high absorptivity in the solar radiation spectrum zone and a low absorptivity in the heat radiation spectrum zone. The inner tube is coaxially inserted into the outer tube and hermetically sealed together at their open ends, with a space therebetween being evacuated to vacuum. A case is provided to open on hinges and to receive the cooking glass tube at its central portion. A curved reflector is bisymmetrically provided on the case, which forms a reflex mirror for the solar rays when the case is opened. A tiltable stand attached to the outside of the case is provided to support the case in an inclined state.

4 Claims, 5 Drawing Figures

ABSTRACT# PORTABLE TYPE SOLAR HEAT COOKER ASSEMBLY

FIELD OF THE INVENTION

The present invention relates to a portable type solar heat cooker assembly which can also be used as a thermos bottle.

BACKGROUND OF THE INVENTION

A thermal insulator bottle formed mainly of an evacuated double glass tube, which is often called a thermos bottle, is designed to keep the temperature of a liquid contained therein constant for a longer period both be preventing heat transmission due to conduction and convection and by reflecting radiant heat. However, the time during which the temperature of the liquid is kept constant is limited so that even boiling water gets cold with the lapse of time. In this connection, the lower the ambient temperature, the larger the cooling rate will be. This results from the fact that the conventional thermos bottle is constructed taking aim at insulating heat without any additional heating/cooling means.

SUMMARY OF THE INVENTION

An object of the present invention is to provide a novel assembly which can be used not only as a thermos bottle but also as a cooker by harnessing solar heat.

The novel assembly according to the present invention is characterized by including a cooking glass tube comprising an outer bottomed glass tube and an inner bottomed glass tube coated with a selective absorption film showing a high absorptivity in the solar radiation spectrum zone and a low absorptivity in the heat radiation spectrum zone. The inner tube is coaxially inserted into said outer tube and hermetically sealed together at their open ends with a space therebetween being evacuated to vacuum. A case is provided to open on hinges and to receive said cooking glass tube at its central portion. A curved reflector is bisymmetrically provided on said case, which forms a reflex mirror for the solar rays when said case is opened. A tiltable stand which is attached to the outside of said case is provided to support said case in an inclined state.

BRIEF DESCRIPTION OF THE DRAWINGS

The above-mentioned and other objects and features of the present invention will become apparent from a reading of the following detailed description with reference to the accompanying drawings, in which.

DETAILED DESCRIPTION OF PREFERRED EMBODIMENTS

Figure 1:
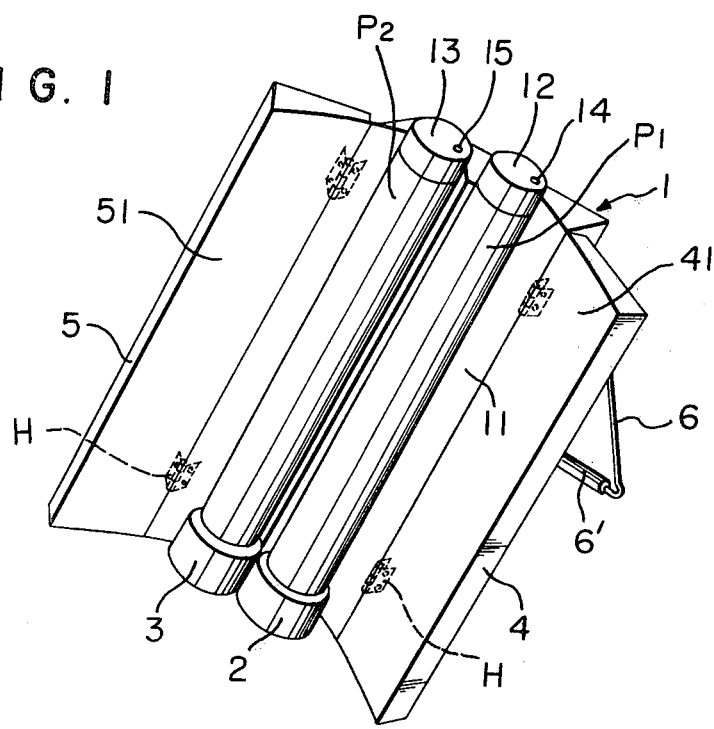
FIG. 1 is a perspective view of one embodiment of the present invention, wherein the case is opened.
Figure 2:
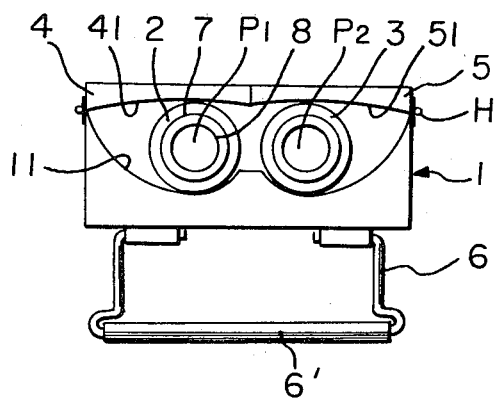
FIG. 2 is a side view of that embodiment wherein the case is closed, and the lids are removed.

Referring to FIGS. 1 and 2, a case shown generally at 1 includes two cooking glass tubes $P_1$ and $P_2$ at its central portion, said tubes being arranged in parallel and spaced away therefrom by spacer rings 2 and 3, as shown in Fig. 2. The case 1 includes on both its sides covering members 4 and 5 which are adapted to open on hinges H.A. foldable and tiltable stand 6 is provided to the outside of the case 1 so as to support the case 1 in an inclined state, and formed at its one end with a non skid rubber member 6'.

The covering members 4, 5 and the case 1 are provided with reflectors 41, 51 and 11 for the solar rays which, upon opening of the members 4 and 5 on the hinges H, define a continuously curved reflex mirror. That reflex mirror is then designed to reflect the solar rays uniformly upon the entire surfaces of the cooking glass tubes $P_1$ and $P_2$.

One embodiment of the cooking glass tubes $P_1$ and $P_2$ will now be explained with reference to FIG. 3.

The cooking glass tube $P_1$ or $P_2$ is of a double structure which comprises an outer bottomed glass tube 7 and an inner bottomed glass tube 8 having a diameter smaller than that of the tube 7. The outer glass tube 7 is made transparent so that it transmits the solar rays, whereas the inner glass tube 8 is coated with a selective absorption film so as to permit efficient collection of the solar heat contained in the solar rays transmitted through the outer glass tube 7. The selective absorption film is composed of a layer obtained by reaction of SUS (abbreviation for Steel Use Stainless) with carbon and a metal film, and has a high absorptivity in the solar radiation spectrum zone and a low absorptivity in the heat radiation spectrum zone. The inner glass tube 8 is coaxially inserted into the outer glass tube 7 at a given interval. Both tubes 8 and 7 are then hermetically sealed together at their open ends. The space between the tubes 7 and 8 is evacuated to a high degree of vacuum to form an insulating vacuum layer.

Figure 3:
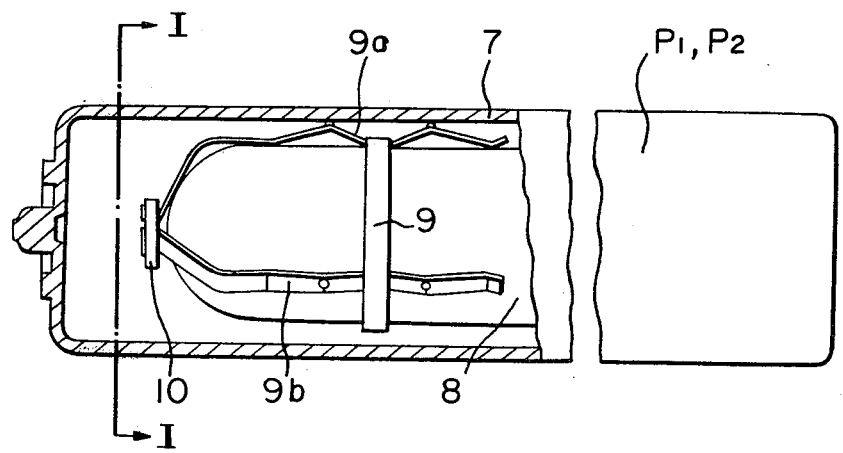
FIG. 3 is a partly cut away sectional view showing one example of the cooking glass tube used in the present invention.
Figure 4:
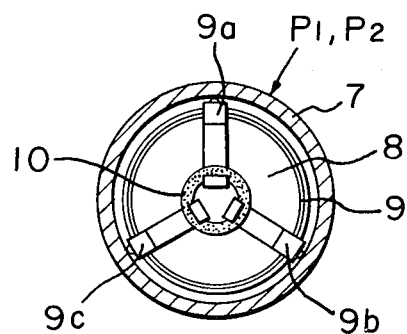
FIG. 4 is a sectional view taken along the line I—I of FIG. 3.

It is noted that, as depicted in FIGS. 3 and 4, a spacer 9 having three engaging pieces 9a-9c is interposed between the outer and inner glass tubes 7 and 8 in the vicinity of their bottomed ends to maintain them in coaxial relation. The three engaging pieces 9a-9c are provided at one end (the left-hand end in the drawing) with a getter metal for the purpose of removing an amount of residual gases present between the outer and inner glass tubes 7 and 8, which cannot be discharged only by a vacuum pump. The residual gases are adsorbed onto the getter metal 10 by flushing so that a high degree of vacuum is maintained between the outer and inner glass tubes 7 and 8.

In FIG. 1, reference numerals 12 and 13 indicate lids for the cooking glass tubes $P_1$ and $P_2$, and 14 and 15 air vents formed in the lids 12 and 13.

Figure 5:
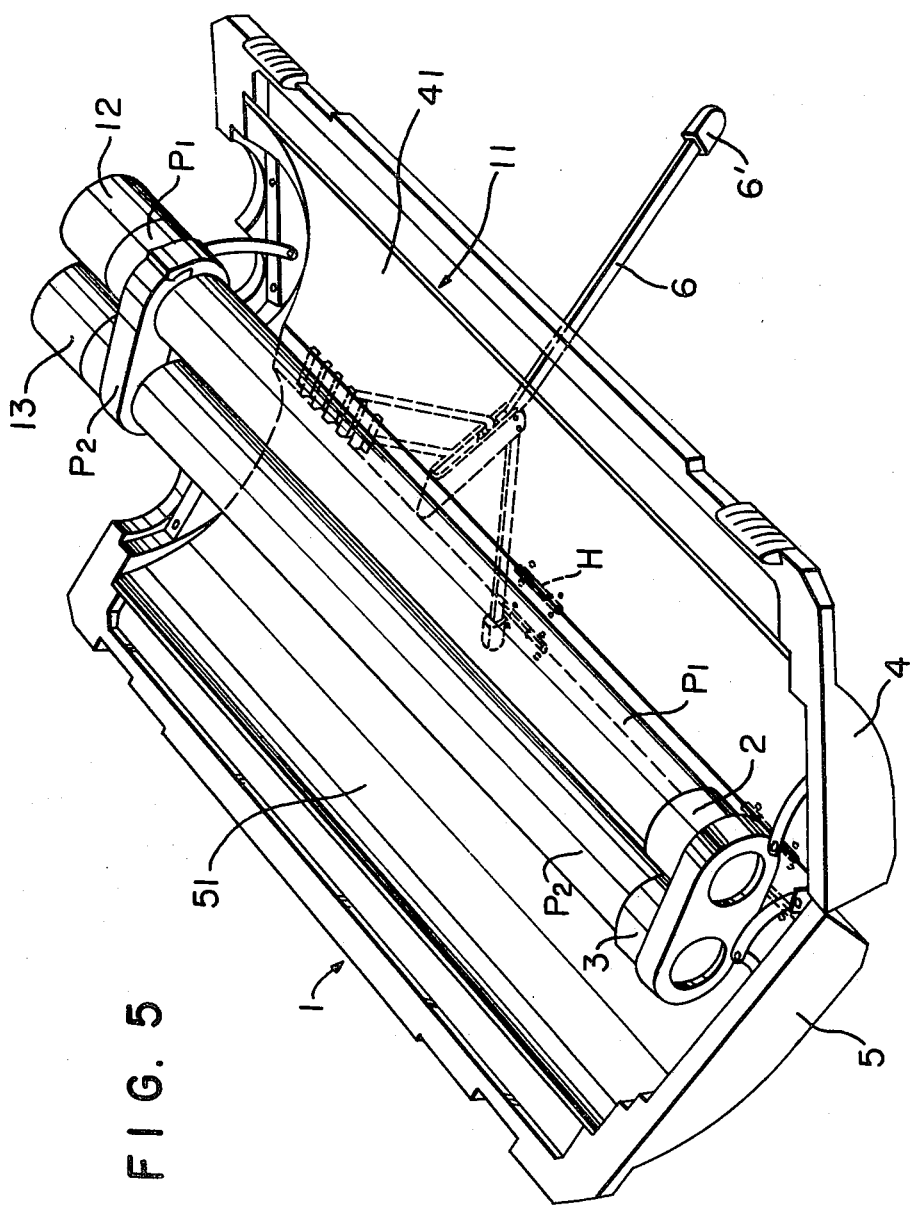
FIG. 5 is a perspective view of another embodiment of the present invention, wherein the case is opened.

FIG. 5 illustrates a second embodiment of the present invention, wherein the case 1 is formed of left and right covering members 4 and 5 hinged at H. As is the case with the first embodiment, the cooking glass tubes $P_1$ and $P_2$ are arranged in parallel by supporting rings 2 and 3 which are lifted up according as the case 1 is opened.

Like the first embodiment, the reflectors 41 and 51 applied over the covering members 4 and 5 are also designed to define a continuously curved reflex mirror, when the case 1 is opened.

The manner of using the cooker assembly according to the present invention is as follows.

The case 1 is first opened, and water is then charged into the cooking glass tubes $P_1$ and $P_2$ with or without vegetables, meat and/or fish. When the covering members 4 and 5 are opened further, as illustrated in FIG. 2, a continuously curved reflex mirror is formed by the reflectors 11, 41 and 51 for the cooking glass tubes $P_1$ and $P_2$. Subsequently, the inclination of the case 1 is adjusted by tilting the stand 6 depending upon the incident angle of the solar rays.

The solar rays striking upon the overall surfaces of the cooking glass tubes $P_1$ and $P_2$ are transmitted through the outer glass tubes 7 of $P_1$ and $P_2$, and reach the selective absorption films applied over the inner glass tubes 8, which permit the tubes 8 to, on the one hand, absorb heat with efficiency and, on the other hand, prevent irradiation of the thus absorbed heat. In this way, the contents of the cooking glass tubes $P_1$ and $P_2$ are heated as such, or under agitation, without causing heat conduction, convection and radiation.

It is preferred that an amount of radiant heat is reduced by closing the open ends of the cooking glass tubes $P_1$ and $P_2$ with the lids 12 and 13 during cooking. To effect more efficient cooking, it is advantageous that at least the inner tube 8 has its strength increased, and pressure valves and relief valves are provided to the lids 12 and 13 to make the pressure in the glass tubes 8 slightly higher than atmospheric pressure.

With the arrangement as described, it is possible to effect a wide range of cooking, viz., obtain a variety of cooked food inclusive of hot drinkables and broth. Moreover, the present invention makes it possible to use solar heat in a very effective manner, since the reflectors for sunbeams are mounted directly on the case having a tiltable stand.

With the cooking glass tube used in the present invention, the heat absorbed in the inner tube is reflected in the centripetal direction without being transmitted to the outer tube, so that the latter tube is always kept at a temperature equal to the outside temperature.

While the invention has been explained with reference to the preferred embodiments, it is understood that many changes or modifications may be made without departing from the scope and spirit of the appended claims.

What is claimed is:

1. A portable type solar heat cooker assembly including a cooking glass tube comprising:
   an inner tube being constructed of glass having a closed bottom and an open end;
   a selective absorption film having a high absorptivity in the solar radiation spectrum zone and a low absorptivity in the heat radiation spectrum zone being coated on an outer surface of said inner tube;
   an outer tube being constructed of glass having a closed bottom and an open end and having a predetermined diameter for permitting said inner tube to be coaxially inserted therein;
   a spacer being positioned on said inner tube for maintaining the coaxial spaced relationship between said inner and outer tubes;
   said inner and outer tubes being hermetically sealed together at their open ends with said space therebetween being evacuated;
   a lid removably positioned on said open end of said inner and outer tubes for permitting insertion of a substance into said inner tube to be cooked and for closing the open end of the inner tube;
   a case having a predetermined length and width and a cover hinged thereto, said cooking glass tube being operatively positioned and extending along the length of the case;
   said cover being a single element hinged to one of the width sides of said case and said cooking glass tube being hinged to said case and said cover for automatic movement to a central position when said cover is opened;
   a curved reflector symmetrically positioned in said case forming a reflex mirror for the solar rays when said case is opened; and
   a collapsible stand attached to an outer surface of said case for adjustably positioning said case in an inclined state.

2. A portable type solar heat cooker according to claim 1, and further comprising two cooking glass tubes being positioned in a side-by-side arrangement within said case.

3. A portable type solar heat cooker according to claim 1, wherein said lid includes an air vent.

4. A portable type solar heat cooker according to claim 1, wherein said lid includes a pressure relief valve.

* * * * *

UNITED STATES PATENT AND TRADEMARK OFFICE
CERTIFICATE OF CORRECTION

PATENT NO. : 4,442,828
DATED      : April 17, 1984
INVENTOR(S): Takeuchi et al

It is certified that error appears in the above-identified patent and that said Letters Patent is hereby corrected as shown below:

In the Heading of the Patent, under section [22] "Filed:", change "Nov. 5, 1984" to --Nov. 5, 1982--.

Signed and Sealed this

Second Day of October 1984

[SEAL]

Attest:

Attesting Officer

GERALD J. MOSSINGHOFF

Commissioner of Patents and Trademarks